United States Patent

Schneider et al.

[11] Patent Number: 5,847,272
[45] Date of Patent: Dec. 8, 1998

[54] FUNCTION TESTING DEVICE FOR AN ACTUATOR SYSTEM SUCH AS A AUTOMATIC FRICTION CLUTCH USED WITH A MOTOR VEHICLE GEARBOX

[75] Inventors: Hans-Jürgen Schneider, Stettbach; Rainer Reuthal, Kürnach; Ingo Carl, Gochsheim, all of Germany

[73] Assignee: Fichtel & Sachs AG, Schweinfurt, Germany

[21] Appl. No.: 800,427

[22] Filed: Feb. 14, 1997

[30] Foreign Application Priority Data

Feb. 16, 1996 [DE] Germany ............... 196 05 722.1

[51] Int. Cl.⁶ .................................................. G01M 15/00
[52] U.S. Cl. ........................ 73/118.1; 73/862.31; 340/453
[58] Field of Search .................... 73/118.1, 862.29, 73/862.31; 340/453, 454

[56] References Cited

U.S. PATENT DOCUMENTS

| | | | |
|---|---|---|---|
| 4,391,131 | 7/1983 | Scourtes | 73/118.1 |
| 4,782,292 | 11/1988 | Gilfoy et al. | |
| 4,998,437 | 3/1991 | Magoolaghan | 73/118.1 |
| 5,207,092 | 5/1993 | Bruno | 73/118.1 |
| 5,515,272 | 5/1996 | Sakai et al. | 73/118.1 |
| 5,537,865 | 7/1996 | Shultz | 73/118.1 |
| 5,723,779 | 3/1998 | Hara et al. | 73/118.1 |

FOREIGN PATENT DOCUMENTS

| | | |
|---|---|---|
| 0448219 | 9/1991 | European Pat. Off. |
| 4237983 | 5/1994 | Germany |
| 2156456 | 10/1985 | United Kingdom |

*Primary Examiner*—Richard Chilcot
*Assistant Examiner*—Eric S. McCall
*Attorney, Agent, or Firm*—Nils H. Ljungman and Associates

[57] ABSTRACT

To be able to verify the function of the actuator system of an automatic clutch or of an automatic transmission of a motor vehicle as a function of the current conditions, including while the motor vehicle is in motion is necessary, the invention teaches that a test circuit actuates the actuator system, starting from a first specified operating position of the clutch or of the transmission to a second specified operating position of the clutch or of the transmission, into an actuator test position in which the clutch or the transmission is still essentially in its first operating position. The test circuit, in the actuator test position, tests the functional capability as a function of data stored in a data memory, which stored data are compared to data measured in the actuator test position of a changing operating parameter.

20 Claims, 2 Drawing Sheets

5,847,272

FUNCTION TESTING DEVICE FOR AN ACTUATOR SYSTEM SUCH AS A AUTOMATIC FRICTION CLUTCH USED WITH A MOTOR VEHICLE GEARBOX

BACKGROUND OF THE INVENTION

1. Field of the Invention

The present invention relates generally to a device to test the function or operation of an electrically controlled actuator system of an automatic or automated torque transmission device, in particular, a clutch or a transmission located in the drive torque path of a motor vehicle and an automatic friction clutch used with a motor vehicle gearbox.

2. Background Information

Conventional clutches, such as friction clutches, which are located in the drive torque path of a motor vehicle, and which were originally actuated by the driver by means of a clutch pedal, are increasingly being actuated automatically by actuator systems, e.g. by electric, hydraulic or pneumatic actuators, as a function of the operating conditions of the motor vehicle. The same is true for transmissions, which were previously actuated manually by the driver by means of a shift lever. To a certain extent, in similar known devices, the functional characteristics of such devices have also been verified by performing plausibility tests in the actuator control system. Such tests, however, can perform a verification of the actuator only to a limited extent. Moreover, such tests have conventionally been performed when the vehicle is at a standstill, which means that it was impossible to detect errors, defects, failures or malfunctions which can occur suddenly while the vehicle is in motion. An undetected failure or malfunction which occurs during operation, which could result in a risk to the passengers, would therefore not be detected.

OBJECT OF THE INVENTION

The object of the present invention is to create a device to verify the function of an electrically controlled actuator system, which device makes it possible to verify the function of the actuator system which is appropriate to the situation. The present invention makes it possible to perform this function testing while the motor vehicle is in operation and in motion. The present invention is therefore based on a device for the verification of the function of an electrically controlled actuator system of an automatic torque transmission device, in particular, a clutch or transmission, which device is located in the drive torque path of a motor vehicle and comprises an electronic test circuit and a display device for the indication or display of a failure or malfunction.

SUMMARY OF THE INVENTION

The present invention teaches that in one preferred embodiment, this object can be accomplished by an arrangement in which an electronic test circuit tests for a failure or malfunction of an actuator system and a display device indicates or displays such a failure or malfunction. The test circuit can comprise first sensor means for the measurement of at least one operating parameter, which parameter changes on account of the actuation operation of the actuator system. The test circuit also comprises memory means for the storage of at least one limit value, which limit value corresponds to the operating parameter to be measured. The test circuit further comprises test means which identify the malfunction on the basis of a comparison of the measured operating parameter and the corresponding limit value. The test circuit, for the function verification, can actuate the actuator system. The actuator system starts from a first actuator position which corresponds to a first defined operating position of the torque transmission device, and moves toward a second actuator position which corresponds to a second defined operating position of the torque transmission device, into an actuator test position which lies between the first actuator position and the second actuator position. In the actuator test position the actuator system sets the torque transmission device to an operating position which essentially corresponds to the first operating position. The test circuit can define the malfunction on the basis of the value of the operating parameter measured in the actuator test position.

In the present invention, the torque transmission device is actuated from a conventional operating position which occurs in operation, and in which the actuator system has set the device, toward another operating position which occurs in operation under normal operating conditions. The actuator system is thereby adjusted to an actuator test position, but one which has been selected so that the actuator actuation movement has either no effect at all on the torque transmission device, or an effect which is negligible in operation. Nevertheless, the functional capability of the actuator system can be verified, as long as it has reached the actuator test position. It is of special advantage that such a verification can be performed independently of the operating condition of the motor vehicle, i.e. even when the vehicle is in motion.

In other words, the function testing of the actuator system for a torque transmission device, i.e. a clutch or transmission, can be performed by adjusting the actuator system into a test position. The test position can preferably be located between a first operating position and a second operating position of the actuator system of the clutch or transmission. The test position can preferably be a position which has been selected because the clutch or transmission can still operate as if the actuator system was in the first operating position. There is typically little or no effect on the operation of the clutch or transmission when the actuator system is moved into the test position. Since there is typically little or no effect on the clutch or transmission, the function testing can occur while the vehicle is in motion. The function test itself can involve the measuring of an operating parameter while the actuator system is in the test position. The operating parameter measured at the test position can then be compared with a limit value, which is stored by the test circuit, to detect for a malfunction.

To create sufficiently reproducible test conditions, the present invention teaches that, preferably, the test circuit for the function test responds to second sensor means which, during the operation of the motor vehicle, identifies the existence of steady-state operating conditions of the torque transmission device. Such steady-state operating conditions can, for example, be a uniform speed of travel, or operating conditions which do not require a change in the position of the clutch or a change in the gear selected by the transmission.

It goes without saying that the verification can be performed during an actuation of the actuator system which is required in any case. However, to be able to verify functional capabilities independently of the instantaneous operating conditions at desired and repeating intervals, e.g. periodically, the invention teaches that after the completion of a function test, the test circuit can move the actuator system back into the first actuator position.

In other words, the test circuit can reset the actuator system for the clutch or transmission to the first operating position from the test position after completion of the function testing. Since the test circuit resets the actuator system, function testing can be performed at regular cycles independently of the current operating conditions of the actuator system.

The torque transmission device, as noted above, can be a clutch, such as a conventional friction clutch, which can be set by means of the actuator system between a fully engaged clutch limit position and a fully disengaged clutch limit position. Clutches of this type conventionally have, in the vicinity of their fully engaged clutch limit position, a portion of the clutch position in which they are fully engaged essentially independent of the position, i.e. the torque supplied by the internal combustion engine of the motor vehicle is transmitted without any slip. To verify the operation of the actuator system of such a clutch, the present invention teaches that preferably the test circuit can move the actuator system for the function verification into an actuator test position in which the clutch can be set to a position in the above-mentioned portion of the clutch position or near this portion of the clutch position. The test circuit ensures that the clutch transmits the full torque from the internal combustion engine even while the function of the device is being tested, or in any case ensures that the small amount of clutch slip which does occur does not have any significant effect on the operation of the vehicle. In any case, the function verification can be performed when the vehicle is in motion.

The second sensor means, which are used when the vehicle is in motion, are preferably speed sensors which identify the presence of a constant speed of travel of the motor vehicle, so that uniform test conditions can be maintained. The first sensor means can appropriately measure an operating parameter which represents the instantaneous clutch position of the clutch. The first sensor means can be a position sensor which determines the position of a part of the actuator system which is mechanically connected to the clutch. The first sensor means can also sense the position of the force transmission means of the actuator system which acts on the clutch. It is also possible to use force or pressure sensors which respond to the actuation forces which are necessary to overcome the spring forces of the main clutch spring.

The torque transmission device can also be a transmission which can be set by means of the actuator system to a neutral gear position which interrupts the drive torque path, as well as to a plurality of gear positions which close or complete the drive torque path. The invention teaches that it is appropriate if the test circuit for the function testing actuates the actuator system, starting from one of the gear positions, over a partial distance toward another of the gear positions into the actuator test position, such that the transmission essentially remains in the one gear position. This requirement can be met if the actuator system exerts only a comparatively small actuation force on the actuator mechanisms of the transmission. This actuation force will not be sufficient to initiate a complete shifting movement. It is possible to take advantage of the inherent inertial characteristics of the transmission when the clutch is engaged. These inertial characteristics, even when the vehicle is in motion, can prevent vibrations or similar phenomena from unintentionally causing a shift from the gear set by the transmission into the neutral position.

In other words, during a function test of the transmission, a small force can be exerted on the actuator system controlling a shift in gear positions to cause the actuator system to move from a first gear position into a test position. The small force exerted on the actuator system can be similar to the force required for an actual shifting of the actuator system from one gear position to another but should not be sufficient to cause an actual shifting. The electronic test circuit can then evaluate the operating condition detected by the first sensor means during the function test to detect for a malfunction.

The first aspect of the invention described above makes it possible to verify the correct function of the actuator system even when the motor vehicle is in operation and in motion. A more comprehensive verification of the actuator system of a transmission which is located together with a clutch in the drive torque path of a motor vehicle can be performed. The transmission can be set, by means of the actuator system, into a neutral position which can interrupt the drive torque path, as well as into a plurality of gear positions which can close the drive torque path. The more comprehensive verification can preferably be realized if the test circuit, when the actuator is in the disengaged position, first moves the actuator system for its function testing from one of the gear positions, or from an intermediate position between the gear positions, into a different position, and then back into the original gear position or intermediate position. The test circuit, for the function testing of the actuator system, can then have sensor means which can detect the essentially complete setting or shifting of the transmission into the above-mentioned different position.

In other words, the gear positions of the transmission can also be used to perform the function testing. To use the gear positions of the transmission to perform the function testing, the clutch should first be in the disengaged position. The actuator system for the transmission can then shift from one gear position to a second gear position and back to the initial gear position. The test circuit can then use sensors to detect the gear positions of the transmission, including the first and second gear positions. The test circuit can then use the sensor data regarding the gear positions of the transmission and check for a complete shifting between the gear positions to detect for a malfunction of the actuator system.

This arrangement, which can be used in combination with the first aspect, but which can also be used independently of the first aspect, can make it possible to include the transmission in the function testing of the actuator system. When the motor vehicle is in motion, the function testing can be performed during a gear change of the transmission, e.g. a shifting operation which is necessary, or the function testing can also be performed when the vehicle is stopped, or before the vehicle is started.

The sensor means which can detect the shifting or setting of the transmission, or possibly only the shifting or setting of the actuator system, to the above-mentioned different position, can be conventional position sensors, like the position sensors which are already present or necessary in automatic transmissions for the detection of the current gear position. It is also possible, however, to use sensor means which measure an operating parameter which changes as a result of the actuation operation of the actuator system, in which case the test circuit appropriately comprises memory means to store a limit value of at least one of the operating parameters to be measured, and test means which identify a malfunction on the basis of a comparison of the operating parameter measured and the corresponding limit value. In this case, it is also possible to use position sensors which measure the actuation distance travelled by the actuator system.

To test the function of the actuator system, the test circuit preferably actuates the actuator system into a gear position in which the drive torque path is uninterrupted, i.e. a position which is not a starting gear. The verification of the presence of a malfunction in a starting gear, e.g. first gear or reverse gear, can have an adverse effect on the operating capabilities of the motor vehicle, i.e. the motor vehicle cannot start. Defects which occur when a higher gear is set or selected can, under some circumstances, pose a threat to the safety of the passengers, because these gears are used only when the vehicle is already in motion.

In other words, the function test of the actuator system should occur for gear positions which are not used as starting gears. Malfunctions in the non-starting gear positions can pose a threat to the safety of passengers because a malfunction may only present itself while the vehicle is in motion. A malfunction in a starting gear can typically be detected by other means such as an inability to start the motor vehicle.

Depending on the instantaneous operating conditions, i.e. whether the vehicle is at a stop or is in motion, the present invention teaches that, to test the function of the actuator system, the test circuit can actuate the actuator system into different gear positions, in a linear or chronological sequence, one after another. In this case, a plurality of gear positions can be selected one after another as part of one and the same test procedure, which is possible, in particular, before the vehicle is started and when it is standing still. In the case of the individual test steps, only individual gear positions can be tested, in which case, however, it is appropriate to test different gear positions in sequential test steps.

The selection of the sensor means to which the test circuit responds can be made as a function of the actuator drive used in the actuator system. If the actuator system comprises an electric drive motor, the invention teaches that the sensor means which measure the operating parameter can sense the amount of current used by the drive motor. Current intensities which are significantly above the limit value can indicate a blockage of the drive motor, while current intensities which are significantly below the limit value can indicate an idle situation, one caused by an interruption of the mechanical connection with the torque transmission device.

In a similar manner, the invention teaches that the function of a hydraulic drive mechanism, such as a hydraulic cylinder of the actuator system, can be verified by having the sensor means, which measure the operating parameter, respond to the hydraulic pressure of a hydraulic system which feeds or supplies the hydraulic drive mechanism.

The determining factor for verifying the correct functioning of the actuator system is not only the fact that it reaches the above-mentioned actuator test position, but that it reaches this position within a specified interval of time. For reaching the actuator test position within a specified interval of time, the test circuit includes time monitoring means which indicate the existence of a malfunction during the function testing if the actuator system does not reach the specified position, for example the actuator test position, within the specified interval of time.

The test circuit can also be used to test additional components of the actuator system. For example, it can also be used in a hydraulic actuator system to test the hydraulic pressure generated by a hydraulic pump. When the test circuit performs recurring test cycles, additional function steps can also be integrated into the test cycles. The purpose of the additional function steps is to increase operational reliability of the system. In an actuator system which comprises a hydraulic force transmission device which includes a master cylinder and a slave cylinder which is connected to the master cylinder by means of a hydraulic line, the present invention teaches that there can be active ventilation means. The active ventilation means correspond to the master cylinder in the unpressurized limit position. The test circuit actuates the master cylinder repeatedly or on a recurring basis into this limit position on the basis of a stored program to perform the function testing.

The above discussed embodiments of the present invention will be described further hereinbelow with reference to the accompanying figures. When the word "invention" is used in this specification, the word "invention" includes "inventions", that is, the plural of "invention". By stating "invention", the Applicants do not in any way admit that the present application does not include more than one patentably and non-obviously distinct invention, and maintains that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained below in greater detail with reference to the embodiments which are illustrated in the accompanying drawings.

DESCRIPTION OF THE PREFERRED EMBODIMENT

Figure 1:
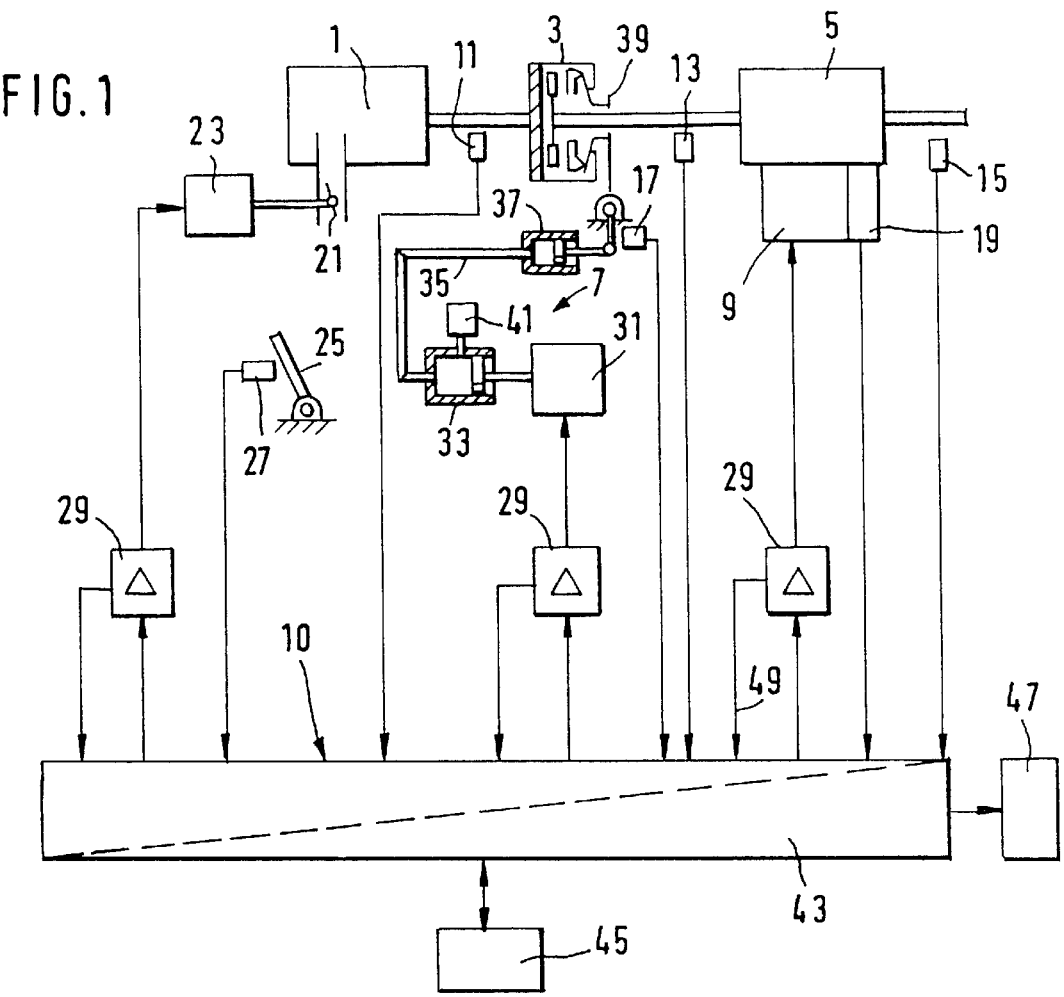
FIG. 1 is a schematic drawing of the torque transmission path of a motor vehicle which has an automatic clutch and a likewise automatic transmission, as well as a device for the function testing of the actuator systems of the clutch and of the transmission.
Figure 3:
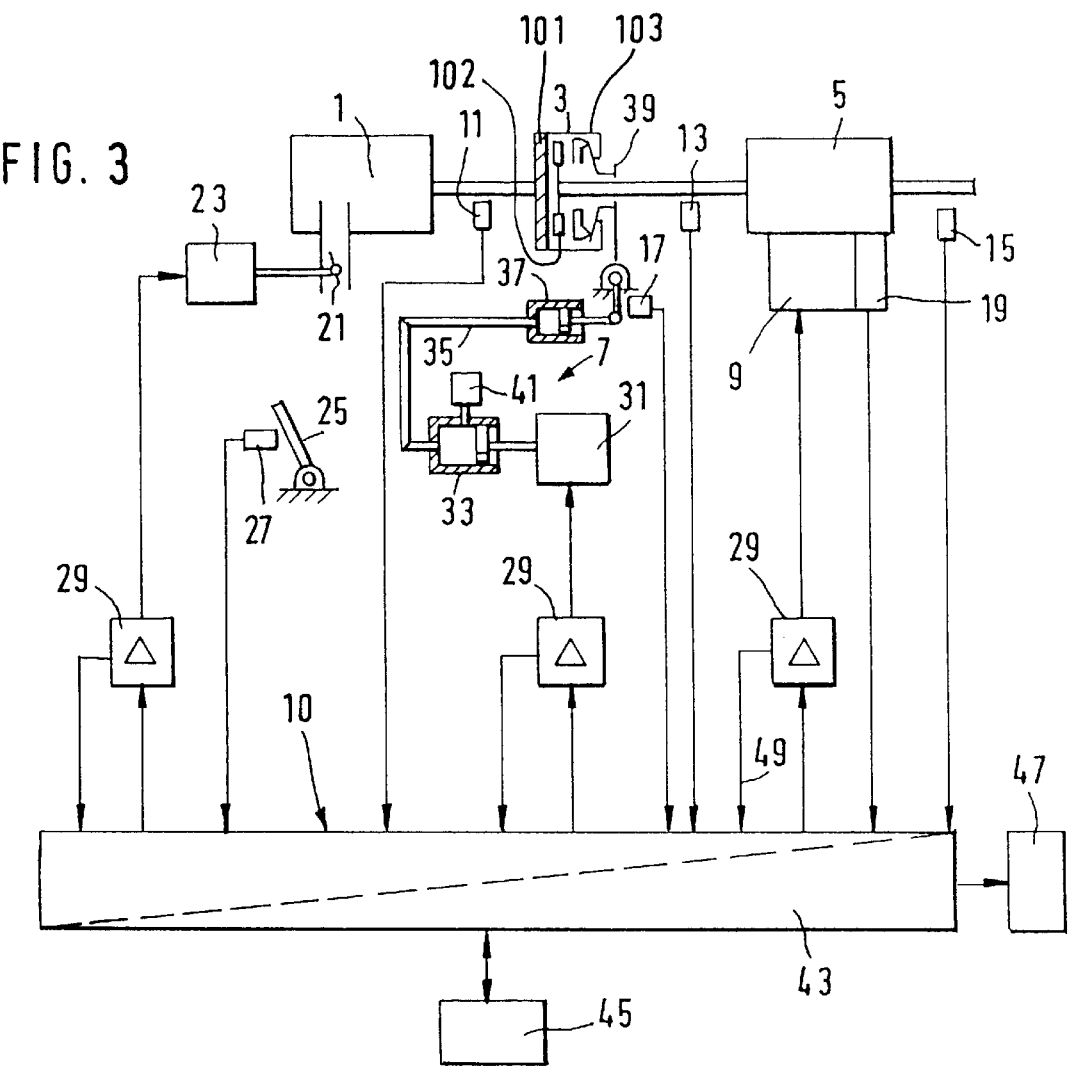
FIG. 3 illustrates additional features of the clutch depicted in FIG. 1.

FIG. 1 is a schematic illustration of the drive torque path of a motor vehicle which can have an internal combustion engine 1 which may act on the drive wheels of the motor vehicle by means of a conventional clutch, which in this embodiment can be realized in the form of a friction clutch 3, which is depicted in further detail in FIG. 3. A transmission 5 can be located downstream of the clutch 3 in a manner not illustrated in any further detail. The clutch 3 and the transmission 5 may be automated by actuator systems 7 and 9 respectively. The clutch 3 and the transmission 5 can be actuated, in a known manner, by means of a control system indicated as 10. The clutch 3 and the transmission 5 can be actuated as a function of the operating conditions of the motor vehicle during startup and when the gears of the transmission 5 are changed. There can be sensors for the control of the operation of the clutch 3 and the transmission 5. To control the operation of the clutch 3 and the transmission 5, sensors can be provided, such as: a speed sensor 11 which measures the output, horsepower or engine speed of the internal combustion engine 1; a speed sensor 13 which measures the input speed of the transmission 5; a sensor 15 which measures the output speed of the transmission 5 and thus the speed of travel of the motor vehicle; as well as a position sensor 17 which measures the instantaneous position of the clutch 3. By means of these sensors: 11; 13; 15; 17; it may be possible to control the engagement and release of the clutch 3, both during starting of the motor vehicle and during gear shifting, in a manner which is appropriate to the conditions encountered.

The transmission 5 can be set by means of the actuator system 9 to a neutral gear position, in which the torque transmission path is interrupted, and to a plurality of gear positions which correspond to the operation of the vehicle and in which the torque transmission path is closed. In the conventional manner, there can be gears which on account of their translation ratios, may be used appropriately to start the vehicle. A gear position sensor system 19 can detect the instantaneous gear position set on the transmission 5, and possibly intermediate positions.

In an additional embodiment, it may be possible to use a torque converter, instead of the clutch 3, so that only the transmission 5 is automatic. Alternatively, instead of the transmission 5, it can also be possible to use a conventional automatic transmission which is constructed on the basis of planetary gear sets or a transmission which is shifted manually.

In the illustrated embodiment of FIG. 1, a power, output or horsepower actuator 21, e.g. a throttle valve or an injector pump, of the internal combustion engine 1 may also be actuated by an actuator 23. The actuator 23 can be controlled by means of a control pedal 25. The instantaneous position of the control pedal 25 is preferably measured by a position sensor 27. The actuator 23 can be controlled not only on the basis of the position of the control pedal 25, but also in a manner which cannot be controlled by a driver, i.e. the control system 10 which controls the actuators 7, 9 during the operation of the motor vehicle.

The actuators 7, 9 and 23 can have hydraulic or pneumatic actuator drives, but in the embodiment illustrated in FIG. 1 they can be equipped with electric motors as actuator drives. The electric motors of actuators 7, 9, 23 can be controlled by means of driver circuits 29 from the control system 10. The actuator system 7 may comprise an electric motor actuator drive 31 which acts on a release system 39 of the clutch 3 by means of a hydraulic force transmission system. The hydraulic force transmission system may include a master cylinder 33 and a slave cylinder 37 which is connected to the master cylinder 33 by means of a hydraulic line 35. The master cylinder 33 can be provided with a reservoir 41 for hydraulic fluid. The reservoir 41 makes possible a ventilation and an equalization of the fluid in the hydraulic system by means of a "blow hole" in the fully engaged position of the clutch 3.

The control system 10, which can be a microprocessor control system, comprises a test circuit 43 which can be in the form of a program routine of the microprocessor control system. The test circuit 43 can test the functional capability of the actuators 7, 9 and 23, if necessary, cyclically, during the operation of the motor vehicle and/or on the basis of specified operating conditions, but which does not have any adverse effect on the other system functions.

In another possible embodiment of the present invention, the control system or microprocessor 10 may comprise the test circuit 43. The test circuit 43 can perform the function testing of the actuator systems 7, 9 and 23 on a regular time interval basis or when specific operating conditions exist. The performing of the function testing should not have a detrimental effect on any other system functions of the microprocessor 10.

The test circuit 43 preferably tests the functional capability of the actuator system 7 under steady-state operating conditions. To test under steady-state operating conditions the test circuit 43 can take advantage of the fact that the clutch 3, in the vicinity of its fully engaged limit position, can be actuated over a partial distance in which the actuator drive 31 is already working against the force of the main clutch spring, but as before, the clutch spring continues to transmit the torque produced by the internal combustion engine 1. An actuator movement of the clutch release system 39 over this partial actuator distance does not preferably have any effect on the torque transmission action of the clutch 3, and can be used for the function testing of the actuator system 7. For function testing of the actuator system 7, the test circuit 43 can be provided with a data memory 45, in which data for an actuator test position can be stored. For the function testing of the actuator system 7 which can work in the manner of a position-control circuit, the test circuit 43 can supply positioning command signals which, if the clutch 3 is functioning correctly, should set the clutch 3 into the actuator test position. By comparing the data on the actuator test position which can be stored in the data memory 45 with the information on the actual position supplied by the position sensor 17, the test circuit 43 can verify the correct operation of the actuator system 7 or detect a malfunction. The malfunction can be communicated to the driver of the motor vehicle by a display 47 or a similar device. To maintain uniform test conditions, the test circuit 43 can evaluate sensor information which indicates steady-state operating conditions, for example, the output signal of the sensor 15 which measures the speed of the vehicle. The test circuit 43 can perform the test, by cyclically calling up the test function, only when the speed of travel at the time in question is constant. Signals from other sensors, such as the speed sensors 11 and 13, can also be used as an indicator of steady-state operation of the vehicle.

FIG. 3 shows the clutch 3 having a flywheel 101, a clutch disc 102 and a pressure plate 103.

In another possible embodiment of the present invention, the clutch 3 can be set to a fully engaged position wherein the engagement force between the clutch disc 102 and the pressure plate 103 is at a maximum. The actuator system 7 can then start to disengage the clutch disc 102 from the pressure plate 103 to reduce the engagement force between the two pieces at the beginning of the function test. The test position can be reached at a point where the entire amount of torque can still be transmitted to the pressure plate 103 with no slippage of the clutch disc 102, but the engagement force between the clutch disc 102 and pressure plate 103 is at a level lower than the maximum engagement force.

In a corresponding manner, the test circuit 43 can test the correct operation of the actuator system 9 of the transmission 5. The transmission 5 preferably has a certain inertial characteristic, as a result of which, when the transmission 5 is under a torque load, some resistance to a gear change can be offered. The present invention teaches that this characteristic can be utilized for the function test, in that the actuation force of the actuator system 9 is limited to a force which is not sufficient for a gear change, but which is sufficient to reach a satisfactorily reliable conclusion with regard to the correct operation of the actuator drive of the actuator system 9. Here again, a value of an operational parameter which is representative of the function of the actuator system 9, which value is stored in the data memory 45, is compared to a measured value for the function test. If the actuator system 9 uses an electric actuator drive, the motor current which is representative of the torque of the actuator drive can be measured. This measurement of motor current can be made appropriately by means of the driver circuit 29 which supplies the operating current to the electric actuator drive of the actuator system 9. The driver circuit 29 can supply a signal representing the motor current to the test circuit 43 through a connection indicated as 49. Position signals from the gear position sensor 19 (not shown in any greater detail) can supply the test circuit 43 with a signal which indicates that the actuator system 9, in its partial force operation, has executed a partial stroke until it reaches an actuator test position. In the actuator test position the mechanisms of the transmission 5 which transmit the shifting force can be moved from a first gear position toward a second gear position, but without leaving the shifting range of the first gear position. Maintaining the force shifting mechanism in the shifting range of the first gear position is essential to maintain the torque transmission function.

The function test described above can also be performed while the vehicle is in motion. Both during or after the function test of the actuator system 7 and the actuator system 9, the test circuit 43 can reset the actuator systems 7, 9 to their initial positions.

The actuator system 9 can comprise a plurality of actuator drives, which correspond to the individual speeds and/or shifting lanes of the transmission 5. The test can be performed individually for the individual actuator drives, and/or groups of actuator drives can be tested simultaneously. The test can also be performed in each test cycle only for an individual gear position, or a number of different gear positions can be tested sequentially, but in the same test cycle.

In the test of the actuator system 9 explained above, the clutch 3 can be fully engaged. Under operating conditions in which the clutch 3 is temporarily fully disengaged or released, for example, during a gear change or during a rather long period before the car is put into gear and started, the actuator system 9 can also be tested using the entire transmission 5. For this purpose, the test circuit 43 can actuate the actuator system 9 out of one of the gear positions into another gear position, or from one intermediate position into another intermediate position, e.g. from a first shifting lane into a second shifting lane. On the basis of the signals supplied by the shift position sensors or gear position sensor system 19 when the other gear position or intermediate gear position is reached, the test circuit 43 can make its decision on whether the system is fully functional.

In this type of test operation, the actuators of the actuator system 9 can be tested individually, sequentially, or in groups, and the gear positions and intermediate positions for each test cycle can be tested individually or in groups, one after another. Depending on the conditions under which the motor vehicle is being operated, the verification can be performed during the gear change for the new gear to be engaged, or the operation of the starting gear can be verified during startup. The test circuit 43 appropriately can actuate the actuator system 9 after the test of a gear or intermediate position, back into the gear or intermediate position it occupied immediately prior to the test. If the test is performed when the motor vehicle is at a standstill, it is appropriate if the function of a gear which can be required after starting is tested before the starting gear is engaged. In this manner malfunctions which would otherwise be identified only when the vehicle is in motion can be detected even before the vehicle is set in motion. The function testing of starting gears can be appropriately performed when the starting gear is engaged, a step which is in any case necessary to start the vehicle.

The driver circuit 29 of the actuator system 23, like the driver circuit 29 of the actuator system 7, also can monitor the current consumption of the electrical actuator motors used as actuator drives, so that malfunctions can be indicated when the current is significantly above or below the specified current limit values. Situations where the current is significantly above or below the specified current limit values can result from blockage, slippage or load shedding of the electric actuator motors.

The test circuit 43 can also monitor the time required to complete the operation of the actuators. Stored in the data memory 45 can be data for discrete intervals, within which the actuator test conditions to be achieved must be reached. If the test conditions are reached to quickly or too slowly, this situation may also be interpreted as slippage or blockage of the actuator system and therefore as a malfunction.

Figure 2:
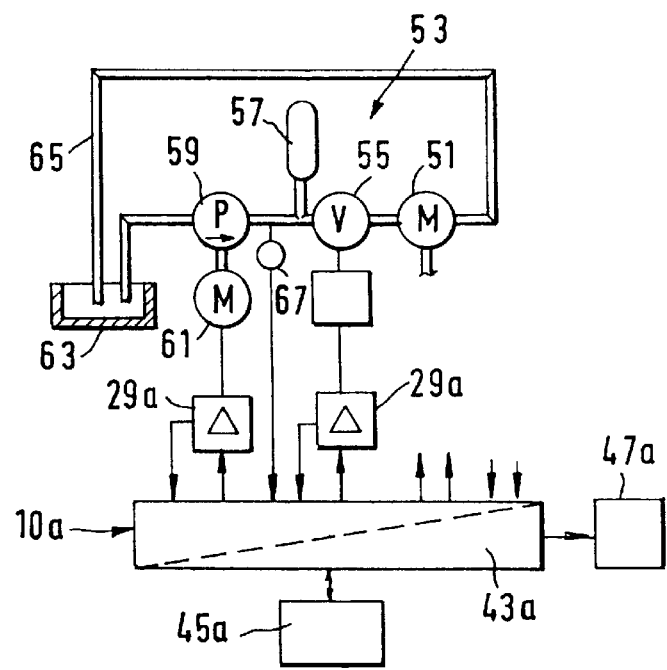
FIG. 2 shows a hydraulic actuator system of the type which can be used in the embodiment illustrated FIG. 1, with the corresponding function test device.

In the embodiment illustrated in FIG. 1, the actuators 7, 9 and 23, preferably comprise electric actuator drives. FIG. 2 illustrates an embodiment of the present invention in which the actuator drive of an actuator can be realized in the form of a hydraulic motor 51. The illustrated embodiment of FIG. 2 is a hydraulic rotary motor. Alternatively, however, a hydraulic cylinder or a similar device can be provided. The hydraulic motor 51 can be used as an actuator drive for actuator systems of the type explained on the basis of FIG. 1. In FIG. 2, the components which correspond to the components illustrated in FIG. 1 are identified by the same reference numbers, plus the letter "a" for purposes of identification. Reference is made to the description which accompanies FIG. 1 for the identification of these components.

The hydraulic actuator drive or hydraulic motor 51 can be connected to a hydraulic circuit 53, and may be supplied from a hydraulic reservoir 57 by means of an electrically controlled valve 55, in particular, a proportional valve. The hydraulic reservoir 57 can be charged by a hydraulic pump 59 driven by an electric motor 61. The hydraulic pump 59 can transport hydraulic fluid from a pump sump 63 into the reservoir 57, and if necessary directly to the hydraulic actuator drive 51. A return line 65 preferably connects the actuator drive 51 to the pump sump 63.

The test circuit 43*a*, in addition to the test functions explained above, can also monitor the functional capabilities of the hydraulic circuit 53. By means of a pressure sensor 67, the test circuit 43*a* monitors whether the output pressure of the hydraulic pump 59 and/or the output pressure of the hydraulic reservoir 57 are within a pressure range specified by data in the data memory 45*a*. The pressure test is again conducted cyclically. By means a cyclical activation of the electric motor 61, it is also possible to test the function of the hydraulic pump 59. The driver circuit 29*a* monitors the motor current, so that blockage or slippage of the electric motor 61 can be detected. During the verification of the hydraulic pump 59, it is also possible to monitor the associated pressure increase. The control valve 55 can also have an electromagnetic or an electric motor drive (not shown) which can be tested cyclically by monitoring its current consumption. Malfunctions are indicated by the test circuit 43*a* and by means of the display 47*a*.

One feature of the invention resides broadly in the device to test the function of an electrically controlled actuator system 7, 9 of an automated torque transmission device, in particular of a clutch 3 or a transmission 5 which is located in the drive torque path of a motor vehicle, and comprising an electronic test circuit 43 and a display device 47 to indicate a malfunction, characterized by the fact that the test circuit 43 comprises first sensor means 17, 19 for the measurement of at least one operating parameter which changes on account of the actuation operation of the actuator system 7, 9, memory means 45 for the storage of at least one limit value which corresponds to the operating parameter to be measured, and test means which identify the malfunctions as a function of a comparison of the measured operating parameter and the corresponding limit value, that the test circuit 43 for the function verification actuates the actuator system 7, 9, starting from a first actuator position which corresponds to a first defined operating position of the torque transmission device, toward a second actuator position which corresponds to a second defined operating position of the torque transmission device, into an actuator test position which is located between the first and the second actuator position, in which the actuator system sets the torque transmission device to an operating position which corresponds essentially to the first operating position, and that the test circuit 43 determines the malfunction as a function of the value of the operating parameter measured in the actuator test position.

Another feature of the invention resides broadly in the device characterized by the fact that the test circuit 43 for the functional verification responds to second sensor means 11, 13, 15 which, when the motor vehicle is in motion, indicate the existence of steady-state operating conditions of the torque transmission device.

Yet another feature of the invention resides broadly in the device characterized by the fact that after performing the function test, the test circuit 43 resets the actuator system 7, 9 to the first actuator position.

Still another feature of the invention resides broadly in the device characterized by the fact that the torque transmission device comprises a clutch 3 which can be set by means of the actuator system 7 between a fully engaged clutch limit position and a fully disengaged or released clutch limit position, which clutch 3, in a portion of clutch position which includes the fully engaged clutch limit position, transmits a uniform torque which is essentially a function of the position, and that the test circuit 43 actuates the actuator system 7 for the function testing into an actuator test position in which the actuator system sets the clutch 3 to a clutch position which is in the portion of the clutch position or near the portion of the clutch position in question.

A further feature of the invention resides broadly in the device characterized by the fact that the second sensor means 15 detects the existence of a constant speed of travel of the motor vehicle.

Another feature of the invention resides broadly in the device characterized by the fact that the first sensor means 17 measures an operating parameter which is representative of the instantaneous clutch position of the clutch 3.

Yet another feature of the invention resides broadly in the device characterized by the fact that the torque transmission device comprises a transmission 5 which can be set by means of the actuator system 9 to a neutral gear position which interrupts the drive torque path, and to a plurality of gear positions which close the drive torque path, and that the test circuit 43 for the function testing of the actuator system 9, actuates the actuator system from one of the gear positions over a partial distance toward another of the gear positions into the actuator test position, such that the transmission 5 remains essentially in the one gear position.

Still another feature of the invention resides broadly in the device characterized by the fact that the torque transmission device comprises a clutch 3 and a transmission 5 which can be set by means of the actuator system 9 to a neutral gear position which interrupts the drive torque path, and to a plurality of gear positions which close the drive torque path, that for the function testing of the actuator system 9 when the clutch 3 is disengaged or released, the test circuit 43 first actuates the actuator system 9 from one of the gear positions or an intermediate position between the gear positions into a different position and then back into the one initial or former gear position or the intermediate position, and that, for the function testing of the actuator system 9, the test circuit 43 has sensor means 19 which detect the essentially complete shifting of the transmission 5 into the above-mentioned different position.

A further feature of the invention resides broadly in the device characterized by the fact that the sensor means 19 which detect the shifting into the different position measure an operating parameter which changes on account of the actuation operation of the actuator system 9, and the test circuit 43 comprises memory means 45 for the storage of at least one of the limit values which correspond to the operating parameter to be measured, and identifies a malfunction on the basis of a comparison of the measured operating parameter and the corresponding limit value.

Another feature of the invention resides broadly in the device characterized by the fact that to verify the function of the actuator system 9, the test circuit 43 actuates the actuator system 9 into a gear position with a closed drive torque path, which gear position is different from a starting gear.

Yet another feature of the invention resides broadly in the device characterized by the fact that the test circuit 43 actuates the actuator system 9, to verify its function, into different gears in a chronological sequence.

Still another feature of the invention resides broadly in the device characterized by the fact that the actuator system 7, 9 comprises an electric drive motor, and the sensor means which measure the operating parameter respond to the driver current of the drive motor.

A further feature of the invention resides broadly in the device characterized by the fact that the actuator system comprises a hydraulic drive mechanism 51, in particular a hydraulic cylinder or hydraulic motor, and the sensor means 67 which measure the operating parameter respond to the hydraulic pressure of a hydraulic system or circuit 53 which supplies the hydraulic drive mechanism 51.

Another feature of the invention resides broadly in the device characterized by the fact that the sensor means which measure the operating parameter are realized in the form of position sensors 17 which determine the position of a component of the actuator system 7, 9 or of the torque transmission device 3, 5.

Yet another feature of the invention resides broadly in the device characterized by the fact that the test circuit 43 has time monitoring means which, during the function test, detect a malfunction if the actuator system 7, 9 has not reached a specified position within a specified interval of time.

Still another feature of the invention resides broadly in the device characterized by the fact that the actuator system 7 comprises a hydraulic force transmission device with a master cylinder 33 and a slave cylinder 37 which is connected to the master cylinder 33 by means of a hydraulic line 35, that in the unpressurized limit position of the master cylinder 33 there are ventilation means which act on the master cylinder 33, and that the test circuit 43 repeatedly actuates the master cylinder 33 into this position on the basis of a stored program control.

Some examples of transmissions in which the present invention may be utilized or adapted for use in the context of the present invention may be disclosed in the following patents: U.S. Pat. No. 5,383,822 entitled "Multiple Speed Automatic Transmission for Automotive Vehicles"; U.S. Pat. No. 5,389,047 entitled "Automotive Automatic Transmission"; U.S. Pat. No. 5,199,316 entitled "Fully-Synchronized Multiple Speed Manual Transmission for Motor Vehicles"; U.S. Pat. No. 4,458,551 entitled "Manual Transmission"; and U.S. Pat. No. 3,858,460 entitled "Four Speed Manual Transmission and Control".

Some examples of semi-automatic transmissions in which the present invention may be utilized or adapted for use in the context of the present invention may be disclosed in the following patents: U.S. Pat. No. 5,444,623 entitled "Reengagement Control/Method for Mechanical Transmission System with Automatic Shift Implementation"; U.S. Pat. No. 5,436,833 entitled "Shift-to-Neutral Reminder Prompt System/Method"; U.S. Pat. No. 5,385,515 entitled "Start Ratio Engagement Control System and Method"; U.S. Pat. No. 5,325,029 entitled "Method of Controlling an Automated Mechanical Transmission Shift Mechanism"; and U.S. Pat. No. 5,261,298 entitled "Enhanced Semi-Automated Mechanical Transmission System".

Some examples of clutch assemblies and various components in which the present invention may be utilized or adapted for use in the context of the present invention may be disclosed in the following patents: U.S. Pat. No. 5,445,256 entitled "Electromagnetic Clutch"; U.S. Pat. No. 5,403,249 entitled "Method and Apparatus for Robust Automatic Clutch Control"; U.S. Pat. No. 5,398,792 entitled "Clutch Device"; U.S. Pat. No. 5,377,799 entitled "Electromagnetic Clutch with Improved Action"; U.S. Pat. No. 5,333,713 entitled "Friction Clutch"; U.S. Pat. No. 5,314,051 entitled "Friction Clutch for a Motor Vehicle, and an Elastic Diaphragm for Such a Clutch"; U.S. Pat. No. 4,684,007 entitled "Clutch Plate"; U.S. Pat. No. 4,635,780 entitled "Clutch Disc for a Motor Vehicle Friction Clutch"; U.S. Pat. No. 4,651,857 entitled "Clutch Disc Unit for a Motor Vehicle Friction Clutch"; U.S. Pat. No. 5,103,688 entitled "Two-mass Flywheel"; and U.S. Pat. No. 4,777,843 entitled "Two-mass Flywheel Assembly With Viscous Damping Assembly".

Some examples of actuators in which the present invention may be utilized or adapted for use in the context of the present invention may be disclosed in the following patents: U.S. Pat. No. 5,410,946 entitled "Hydraulic Actuator"; U.S. Pat. No. 5,390,497 entitled "Self-Adjusting Clutch Actuator"; U.S. Pat. No. 5,389,864 entitled "Actuator with Motor and Feedback Driven by a Common Power Supply"; U.S. Pat. No. 5,379,969 entitled "Hydraulic Actuator with Mechanical Lock and Installation"; U.S. Pat. No. 5,379,679 entitled "Actuator with Series Arranged Control Valves"; and U.S. Pat. No. 5,267,635 entitled "Clutch Actuator System".

Some examples of sensors for transmissions in which the present invention may be utilized or adapted for use in the context of the present invention may be disclosed in the following patents: U.S. Pat. No. 5,468,197 entitled "Shift Rail Position Sensor for Vehicle Transmission"; U.S. Pat. No. 5,453,732 entitled "Shift Lever Position Sensor"; U.S. Pat. No. 5,398,018 entitled "Automatic Transmission Lever Position Indicating Device"; U.S. Pat. No. 5,231,254 entitled "Automobile Transmission Mode Sensing Apparatus"; and U.S. Pat. No. 5,187,977 entitled "Device for Recognition of Driving on a Grade".

Examples of sensors and various components for friction clutches in which the present invention may be utilized or adapted for use in the context of the present invention may be disclosed in the following patents: U.S. Pat. No. 5,411,124 entitled "Method and Apparatus for Determining Clutch Touch Point"; U.S. Pat. No. 5,337,866 entitled "Device for Monitoring a Friction Clutch"; and U.S. Pat. No. 5,322,150 entitled "Arrangement for Controlling the Slip of an Automatic Friction Clutch".

Examples of control systems in which the present invention may be utilized or adapted for use in the context of the present invention may be disclosed in the following patents: U.S. Pat. No. 5,421,440 entitled "Control System for Automotive Clutch"; U.S. Pat. No. 5,377,797 entitled "Clutch Engagement Control Method in Response to Transmission Shift Lever Position"; U.S. Pat. No. 5,332,074 entitled "Incipient Clutch Control System"; U.S. Pat. No. 5,325,082 entitled "Comprehensive Vehicle Information Storage System"; U.S. Pat. No. 5,1314,050 entitled "Clutch Mode Control Logic"; U.S. Pat. No. 5,299,200 entitled "Adaptive Interface that Automatically Adjusts for Timing Skews Caused by Signal Delays"; U.S. Pat. No. 5,293,316 entitled "Closed Loop Launch and Creep Control for Automatic Clutch"; and U.S. Pat. No. 5,253,272 entitled "Digital Data Transmission System with Adaptive Predistortion of Transmitted Pulses".

Examples of computer systems and microprocessors in which the present invention may be utilized or adapted for use in the context of the present invention may be disclosed in the following patents: U.S. Pat. No. 5,450,768 entitled "Clutch Engagement Modulation to Control Acceleration"; U.S. Pat. No. 5,411,124 entitled "Method and Apparatus for Determining Clutch Touch Point"; U.S. Pat. No. 5,389,864 entitled "Actuator with Motor and Feedback Driven by a Common Power Supply"; U.S. Pat. No. 5,363,027 entitled "Apparatus and Method of Controlling the Robotic Driving of a Vehicle"; U.S. Pat. No. 5,337,866 entitled "Device for Monitoring a Friction Clutch"; U.S. Pat. No. 5,314,050 entitled "Clutch Mode Control Logic"; U.S. Pat. No. 5,265,018 entitled "Transmission Speed Matching Control"; and U.S. Pat. No. 5,233,525 entitled "Electronic Control for Transmission Gear Skip Shaft".

Some examples of speed sensors in which the present invention may be utilized or adapted for use in the context of the present invention may be disclosed in the following patents: U.S. Pat. No. 5,385,047 entitled "Angular Speed Measuring Device"; U.S. Pat. No. 5,309,094 entitled "Bearing Rotary Speed Sensor with Concentric Multipole Magnetic Rings Axially Aligned with Collector Branches"; U.S. Pat. No. 5,239,263 entitled "Magnetic Rotation Sensor for Rotary Shaft"; and U.S. Pat. No. 5,197,326 entitled "Arrangement for Monitoring Rotational Speed Sensor".

Some examples of shift mechanisms in which the present invention may be utilized or adapted for use in the context of the present invention may be disclosed in the following patents: U.S. Pat. No. 5,479,345 entitled "Method and Apparatus for Selecting Shift Points in an Automated Mechanical Transmission"; U.S. Pat. No. 5,435,212 entitled "Semi-Automatic Shift Implementation"; U.S. Pat. No. 5,385,223 entitled "Shift Control Mechanism for a Multi-Speed Countershaft Transmission"; U.S. Pat. No. 5,377,800 entitled "Hydraulically-Actuated Shift System for a Transfer Case"; U.S. Pat. No. 5,341,295 entitled "Vehicle Transmission Shift Control Apparatus Having Means for Suitably Determining Compensating Coefficient Used in Determining Shifting of the Transmission"; U.S. Pat. No. 5,321,993 entitled "Transmission Shift Control Apparatus"; U.S. Pat. No. 5,243,871 entitled "Control Lever Apparatus for Generating Electrical Control Signals"; U.S. Pat. No. 5,196,663 entitled "Transmission Control Apparatus for Automotive Vehicle"; and U.S. Pat. No. 5,179,870 entitled "Shift Control Lever Assembly".

Some examples of hydraulic circuits and components in which the present invention may be utilized or adapted for use in the context of the present invention may be disclosed in the following patents: U.S. Pat. No. 5,398,507 entitled "Hydraulic Circuit System"; U.S. Pat. No. 5,301,597 entitled "Hydraulic Cylinder"; U.S. Pat. No. 5,284,017 entitled "Hydraulic Master Cylinder"; and U.S. Pat. No. 5,211,099 entitled "Slave Cylinder for a Hydraulic Actuating System of a Motor Vehicle Friction Clutch".

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 196 05 722.1, filed on Feb. 16, 1996, having inventors Hans-Jürgen Schneider, Rainer Reuthal, and Ingo Carl and DE-OS 196 05 722.1 and DE-PS 196 05 722.1, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A clutch for a motor vehicle, said clutch comprising:
   a pressure plate;
   a clutch disc;
   said clutch disc being disposed to contact said pressure plate;
   means for engaging and disengaging said clutch disc and said pressure plate;
   said engaging and disengaging means comprising an actuator arrangement;
   said actuator arrangement having a first operating position and a second operating position; and
   said actuator arrangement comprising:
   means for setting said actuator arrangement into a test position between said first operating position and said second operating position;
   said test position of said actuator arrangement being substantially similar to said first operating position;
   means for measuring at least one operating condition of said actuator arrangement upon said actuator arrangement being in said test position;
   said measuring means comprising a first sensor arrangement;
   means for storing at least one preferred operating condition to correspond to the at least one measured operating condition;
   means for comparing the at least one measured operating condition with the preferred operating condition to detect a malfunction of said actuator arrangement; and
   a display device to indicate the presence of a malfunction of said actuator arrangement.

2. Device to test the function of an electrically controlled actuator system of an automated torque transmission device, in particular of a clutch or a transmission which is located in a drive torque path of a motor vehicle, and comprising an electronic test circuit and a display device to indicate a malfunction,
   characterized by the fact
   that the test circuit comprises first sensor means for a measurement of at least one operating parameter which changes on account of an actuation operation of the actuator system, memory means for a storage of at least one limit value which corresponds to the operating parameter to be measured, and test means which identify the malfunctions as a function of a comparison of the measured operating parameter and the corresponding limit value, that the test circuit a function verification actuates the actuator system, starting from a first actuator position which corresponds to a first defined operating position of the torque transmission device, toward a second actuator position which corresponds to a second defined operating position of the torque transmission device, into an actuator test position which is located between the first and the second actuator position, in which the actuator system sets the torque transmission device to an operating position which corresponds essentially to the first operating position, and that the test circuit determines the malfunction as a function of the value of the operating parameter measured in the actuator test position.

3. Device as claimed in claim 2, characterized by the fact that the test circuit for the functional verification responds to second sensor means which, when the motor vehicle is in motion, indicate an existence of steady-state operating conditions of the torque transmission device.

4. Device as claimed in claim 3, characterized by the fact that after performing the function test, the test circuit resets the actuator system to the first actuator position.

5. Device as claimed in claim 4, characterized by the fact that the torque transmission device comprises a clutch which can be set by means of the actuator system between a fully engaged clutch limit position and a fully disengaged clutch limit position, which clutch, in a portion of clutch position which includes the fully engaged clutch limit position, transmits a uniform torque which is essentially a function of the position, and that the test circuit actuates the actuator system for the function testing into an actuator test position in which the actuator system sets the clutch to a clutch position which is in the portion of the clutch position or near the portion of the clutch position in question.

6. Device as claimed in claim 5, characterized by the fact that the second sensor means detect the existence of a constant speed of travel of the motor vehicle.

7. Device as claimed in claim 6, characterized by the fact that the first sensor means measure an operating parameter which is representative of an instantaneous clutch position of the clutch.

8. Device as claimed in claim 7, characterized by the fact that the torque transmission device comprises a transmission which can be set by means of the actuator system to a neutral gear position which interrupts the drive torque path, and to a plurality of gear positions which close the drive torque path, and that the test circuit for the function testing of the actuator system, actuates the actuator system from one of the gear positions over a partial distance toward another of the gear positions into the actuator test position, such that the transmission remains essentially in the one gear position.

9. Device as claimed in claim 8, characterized by the fact that the torque transmission device comprises a clutch and a transmission which can be set by means of the actuator system to a neutral gear position which interrupts the drive torque path, and to a plurality of gear positions which close the drive torque path, that for the function testing of the actuator system when the clutch is disengaged, the test circuit first actuates the actuator system from one of the gear positions or an intermediate position between the gear positions into a different position and then back into the initial gear position or the intermediate position, and that, for the function testing of the actuator system, the test circuit has sensor means which detect the essentially complete shifting of the transmission into the above-mentioned different position.

10. Device as claimed in claim 9, characterized by the fact that the sensor means which detect the shifting into the different position measure an operating parameter which changes on account of the actuation operation of the actuator system, and the test circuit comprises memory means for the storage of at least one of the limit values which correspond to the operating parameter to be measured, and identifies a malfunction on the basis of a comparison of the measured operating parameter and the corresponding limit value.

11. Device as claimed in claim 10, characterized by the fact that to verify the function of the actuator system, the test circuit actuates the actuator system into a gear position with a closed drive torque path, which gear position is different from a starting gear.

12. Device as claimed in claim 11, characterized by the fact that the test circuit actuates the actuator system, to verify the system's function, into different gears in a chronological sequence.

13. Device as claimed in claim 12, characterized by the fact that the actuator system comprises an electric drive motor, and the sensor means which measure the operating parameter respond to the driver current of the drive motor.

14. Device as claimed in claim 13, characterized by the fact that the actuator system comprises a hydraulic drive mechanism, in particular a hydraulic cylinder or hydraulic motor, and the sensor means which measure the operating parameter respond to the hydraulic pressure of a hydraulic system which supplies the hydraulic drive mechanism.

15. Device as claimed in claim 14, characterized by the fact that the sensor means which measure the operating parameter are realized in the form of position sensors which determine the position of a component of the actuator system or of the torque transmission device.

16. Device as claimed in claim 15, characterized by the fact that the test circuit has time monitoring means which, during the function test, detect a malfunction if the actuator system has not reached a specified position within a specified interval of time.

17. Device as claimed in claim 16, characterized by the fact that the actuator system comprises a hydraulic force transmission device with a master cylinder and a slave cylinder which is connected to the master cylinder by means of a hydraulic line, that in an unpressurized limit position of the master cylinder there are ventilation means which act on the master cylinder, and that the test circuit repeatedly actuates the master cylinder into the limit position on the basis of a stored program control.

18. Device as claimed in claim 2, characterized by the fact that after performing the function test, the test circuit resets the actuator system to the first actuator position.

19. Device as claimed in claim 3, characterized by the fact that the torque transmission device comprises a clutch which can be set by means of the actuator system between a fully engaged clutch limit position and a fully disengaged clutch limit position, which clutch, in a portion of clutch position which includes the fully engaged clutch limit position, transmits a uniform torque which is essentially a function of the position, and that the test circuit actuates the actuator system for the function testing into an actuator test position in which the actuator system sets the clutch to a clutch position which is in the portion of the clutch position or near the portion of the clutch position in question.

20. Device as claimed in claim 5, characterized by the fact that the first sensor means measure an operating parameter which is representative of an instantaneous clutch position of the clutch.

* * * * *

UNITED STATES PATENT AND TRADEMARK OFFICE
CERTIFICATE OF CORRECTION

PATENT NO. : 5,847,272
DATED : December 8, 1998
INVENTOR(S) : Hans-Jürgen SCHNEIDER, Rainer REUTHAL and Ingo CARL It is certified that error appears in the above-identified patent and that said Letters Patent is hereby corrected as shown below:

In column 16, line 43, Claim 2, after 'circuit' insert --for--.

Signed and Sealed this

Twentieth Day of July, 1999

Attest:

Q. TODD DICKINSON

*Attesting Officer*   *Acting Commissioner of Patents and Trademarks*